United States Patent
Dasaraju et al.

(10) Patent No.: US 11,263,287 B1
(45) Date of Patent: Mar. 1, 2022

(54) SYSTEM TO EXTEND FUNCTIONALITY OF THIRD PARTY APPS ON MULTI-FUNCTION DEVICE WEB BROWSERS

(71) Applicant: Xerox Corporation, Norwalk, CT (US)

(72) Inventors: Chandra Sekhar Varma Dasaraju, Webster, NY (US); Christopher M. Villone, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/152,589

(22) Filed: Jan. 19, 2021

(51) Int. Cl.
*G06F 17/00* (2019.01)
*G06F 16/958* (2019.01)
*G06F 16/955* (2019.01)
*H04N 1/00* (2006.01)

(52) U.S. Cl.
CPC ........ *G06F 16/986* (2019.01); *G06F 16/9558* (2019.01); *G06F 16/972* (2019.01); *H04N 1/00464* (2013.01)

(58) Field of Classification Search
None
See application file for complete search history.

(56) References Cited

U.S. PATENT DOCUMENTS

| | | | | |
|---|---|---|---|---|
| 8,910,283 | B1* | 12/2014 | Gusarov | G06F 21/575 726/22 |
| 2013/0104114 | A1* | 4/2013 | Reiss | G06F 8/65 717/170 |
| 2013/0152070 | A1* | 6/2013 | Bhullar | G06F 16/23 717/173 |

OTHER PUBLICATIONS

Alan B, "Native vs Non-native mobile apps—what's the difference", total pages 6, published Oct. 25, 2020, URL:<https://medium.com/swlh/native-vs-non-native-mobile-apps-whats-the-difference-b3a641e06f52> (Year: 2020).*

* cited by examiner

*Primary Examiner* — Mustafa A Amin

(57) ABSTRACT

A method is disclosed. For example, the method executed by a processor of a multi-function device (MFD) includes accessing a third party application stored in a memory of the MFD, determining that the third party application has been updated, retrieving an update to the third party application from a server that stores updates for third party applications, and executing the third party application with the update on the MFD.

11 Claims, 5 Drawing Sheets

SYSTEM TO EXTEND FUNCTIONALITY OF THIRD PARTY APPS ON MULTI-FUNCTION DEVICE WEB BROWSERS

The present disclosure relates generally to multi-function devices (MFDs), and relates more particularly to a method and system to extend functionality of third party apps on MFD web browsers.

BACKGROUND

Multi-function devices (MFDs) are used to process print jobs. An MFD can perform a variety of different functions including printing, scanning, copying, faxing, and the like.

Some MFDs may have graphical user interfaces (GUIs). The GUIs can include applications such as web browsers that can allow users to access third party applications (also referred to herein as "apps") on the MFD. The web browsers on the GUIs are deployed in proprietary programming languages that are unique to the respective MFDs. The third party applications that are accessible on the MFDs may be modified to be compatible within the web browsers of the MFDs. Thus, users can access third party applications directly on an MFD.

SUMMARY

According to aspects illustrated herein, there are provided a method and a non-transitory computer readable medium for executing a third party application on an MFD that has been updated. One disclosed feature of the embodiments is a method, executed by a processor of the MFD, that comprises accessing a third party application stored in a memory of the MFD, determining that the third party application has been updated, retrieving an update to the third party application from a server that stores updates for third party applications, and executing the third party application with the update on the MFD.

Another disclosed feature of the embodiments is a non-transitory computer-readable medium having stored thereon a plurality of instructions, the plurality of instructions including instructions which, when executed by a processor, cause the processor to perform operations to access a third party application stored in a memory of the MFD, determine that the third party application has been updated, retrieve an update to the third party application from a server that stores updates for third party applications, and execute the third party application with the update on the MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a system and method to extend functionality of third party applications on MFD web browsers. As discussed above, some MFDs may have graphical user interfaces (GUIs). The GUIs can include applications such as web browsers that can allow users to access third party applications on the MFD. The web browsers on the GUIs are deployed in proprietary programming languages that are unique to the respective MFDs. The third party applications that are accessible on the MFDs may be modified to be compatible within the web browsers of the MFDs. Thus, users can access third party applications directly on an MFD.

However, over time, third party application developers may update the third party applications. When the third party applications are updated, the applications may no longer function properly on the web browser of the MFD. In addition, the third party application developers are not responsible for updating the third party applications on the MFD that may be deployed using the proprietary programming language of associated with the MFD.

In some instances, the service provider of the MFD may manually update every instance of the third party applications on MFDs at customer locations. This is extremely inefficient, time consuming, and expensive.

One embodiment of the present disclosure detects when a third party application has been updated and stores an update in a server. An MFD may access the server to obtain the update to the third party application and deploy the update locally. As a result, the third party application may execute properly on the MFD even when updated by the third party application developer. In addition, the service provider may avoid having to manually update the applications at each customer site.

Furthermore, the updates may be written for each type of MFD that may be deployed at customer sites. For example, each MFD may have different capabilities or MFD web browser versions. Thus, different versions of the updates to the third party application may be written that are compatible with the different models of MFDs deployed at customer locations. In one embodiment, the update may be dynamically packaged for a requesting MFD based on the model number or capabilities of the MFD. For example, certain features associated with the update may be removed before providing the update to the requesting MFD.

Figure 1:
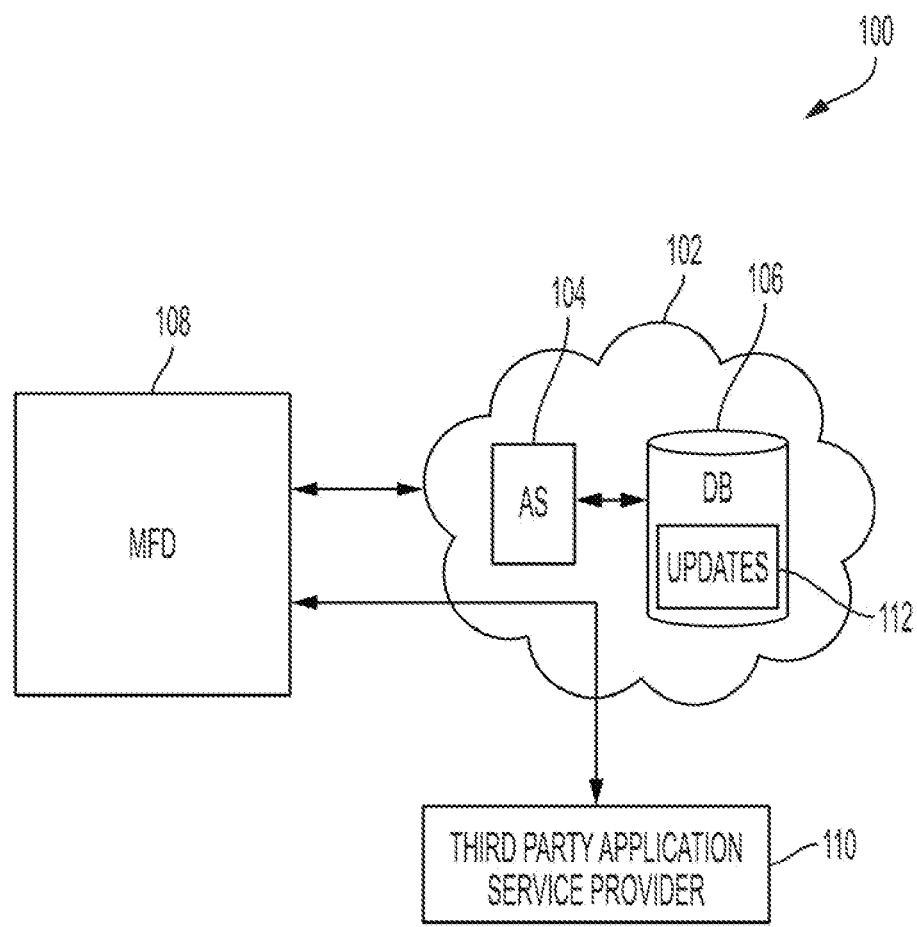
FIG. 1 illustrates a block diagram of an example network of the present disclosure.

FIG. 1 illustrates an example network 100 of the present disclosure. In one embodiment, the network 100 may include an internet protocol (IP) network 102. In one embodiment, the IP network 102 may include an application server (AS) 104 and a database (DB) 106. Although a single AS 104 and single DB 106 are illustrated in FIG. 1, it should be noted that any number of application servers and databases may be deployed in the IP network 102. The AS 104 and the DB 106 may be operated by a service provider that manages the operation and maintenance of an MFD 108.

It should be noted that the IP network 102 has been simplified for ease of explanation. For example, the IP network 102 may include additional network components that are not shown. For example, the IP network 102 may include access networks, a gateway, a firewall, various network elements, and the like.

In one embodiment, the AS 104 may be communicatively coupled to the MFD 108. Although a single MFD 108 is illustrated in FIG. 1, it should be noted that any number of MFDs 108 may be deployed at various customer sites at different geographic locations.

In one embodiment, the MFD 108 may launch versions of a third party application associated with a third party application service provider 110. The local version of the third party application may be written in a proprietary format or language that is compatible with the MFD 108, or a web browser of the MFD 108, by a service provider of the MFD 108. The local version of the third party application may allow the MFD 108 to access files stored by the third party application service provider 110 (e.g., in a server hosted by the third party application service provider 110) using a user interface or web browser of the MFD 108 via the IP network 102.

In some instances, the third party application service provider 110 may make updates to the third party application. However, when updates are made, the local version of the third party application stored on the MFD 108 may no longer function properly.

In one embodiment, the service provider of the MFD 108 may periodically test or execute remote debugging operations (e.g., via the AS 104) on the MFD 108. The service provider of the MFD 108 may detect that the third party application has been updated via the debugging operation and determine that the local version of the third party application on the MFD 108 is no longer operating correctly.

In response, the service provider of the MFD 108 may generate at least one update that can be stored in updates 112 in the DB 106. The updates 112 may include different updates for different models of MFDs 108 that may have different capabilities. For example, the service provider may have deployed three different models of MFDs 108 with different capabilities. Thus, the updates 112 may include three different updates for the third party application associated with each one of the three different models of MFDs 108.

In one embodiment, the updates 112 may include a single update that can be dynamically packaged to include select features based on different models of MFDs 108 that may have different capabilities. For example, the AS 104 may receive a model number and capabilities of the MFD 108 when an update is requested. The AS 104 may select the update features to package for the MFD 108 and create an update package that can be transmitted back to the MFD 108. Thus, there is a single instance of the update stored as separate files of each feature associated with the update that can be selected for a particular model of MFD 108.

In one embodiment, when the AS 104 detects an update to a third party application, the AS 104 may transmit an annotation or extension to the local version of the third party application stored on the MFD 108. When the third party application is subsequently selected for execution on the MFD 108, the annotation or extension may direct the MFD 108 to connect to the AS 104 to obtain one of the updates 112.

As a result, the system of the present disclosure allows a single instance, or a single location, of the update of a third party application to be stored in the IP network 102. As a result, the service provider may avoid the need to manually deploy the update on each MFD 108 locally whenever the third party application service provider 110 updates a third party application.

Figure 2:
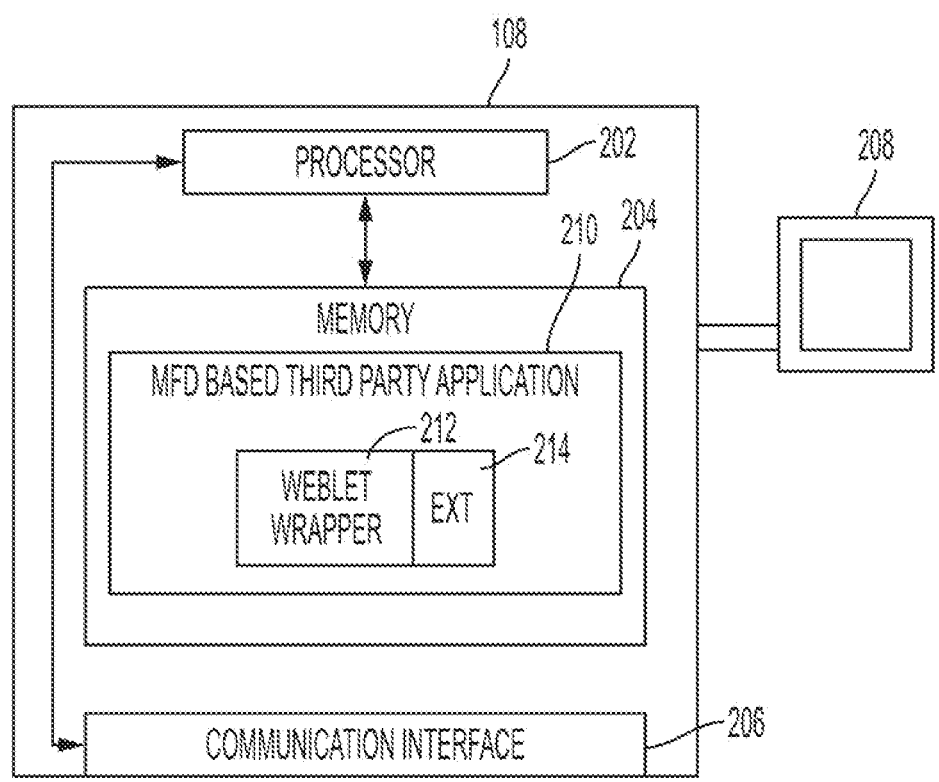
FIG. 2 illustrates a block diagram of an example MFD of the present disclosure.

FIG. 2 illustrates an example of the MFD 108 of the present disclosure. It should be noted that the MFD 108 has been simplified for ease of explanation and may include additional components that are not shown. For example, the MFD 108 may include paper trays, printheads, toner cartridges, an optical scanner, a digital front end, transport paths, finishing modules, and the like.

In one embodiment, the MFD 108 may include a processor 202, a memory 204, a communication interface 206, and a display 208. The processor 202 may be communicatively coupled to the memory 204, the communication interface 206, and the display 208. The processor 202 may execute instructions stored in the memory 204 to perform the functions described herein. The processor 202 may control operation of the communication interface 206 and the display 208.

In one embodiment, the memory 204 may be any type of non-transitory computer readable medium. For example, the memory 204 may be a random access memory (RAM), a read-only memory (RAM), a hard disk drive, a solid state drive, and the like.

In one embodiment, the memory 204 may include an MFD based third party application 210. The MFD based third party application 210 may be a version of a third party application distributed by the third party application service provider 110. For example, the third party application service provider 110 may be a cloud storage service provider. The cloud storage service provider may distribute an application that allows users to access files stored in the cloud storage of the cloud storage service provider. However, the application may be distributed for mobile devices and desktop computers and not for MFDs. The MFD 108 may have an operating system, a proprietary web browser for the MFD 108, and/or a programming language that are different from mobile devices and desktop computers. Thus, the service provider or manufacturer of the MFD 108 may create a version of the third party application that is compatible with the operating system, web browser, and/or programming language associated with the MFD 108.

In one embodiment, the MFD based third party application 210 may be a weblet. A weblet may be a snippet of code designed to encapsulate some hypertext mark-up language (HTML) functions that are generated and maintained by a service provider of the MFD 108. The weblet may allow certain functions on a proprietary web browser associated with the MFD 108 to be executed. Thus, some HTML functions that may be executed on a desktop computer may be executed using a weblet on the web browser of the MFD 108. A weblet may be created for each third party application that is to be executed locally on the MFD 108.

In one embodiment, each weblet may be called using a weblet wrapper 212. The weblet wrapper 212 may include some input fields that allow the correct weblet to be executed. In one embodiment, the weblet wrapper 212 may be annotated with an extension (EXT) 214 when an update to the MFD based third party application 210 is detected and generated, as described above.

In one embodiment, the extension 214 may include an indication that an update for the MFD based third party application 210 exists and instructions associated with how to obtain the update. For example, the extension 214 may include a universal resource locator (URL) address of the AS 104 to access the updates 112 stored in the DB 106.

In one embodiment, when the extension 214 is detected by the processor 202, the processor 202 may connect to the URL of the AS 104 via the communication interface 206. The communication interface 206 may be a wired or wireless communication interface. For example, the communication interface 206 may be an Ethernet connection or a WiFi radio, and the like.

The processor 202 may transmit a request for the update to the AS 104. The request may include a model number of the MFD 108, a serial number of the MFD 108, capability information, and the like. The capability information may include information regarding the capability of the display 208, a web browser version of the MFD 108, and the like.

Based on the information received from the processor 202, the AS 104 may provide the correct update from the updates 112 back to the MFD 108. For example, the AS 104 may provide the update associated with the model number of the MFD 108, or may selectively package features of the update that are compatible with the MFD 108 to transmit to the MFD 108. The processor 202 may receive the update and then execute the MFD based third party application 210 with the update.

In one embodiment, the third party application may be a cloud storage service, as noted above. The MFD based third party application 210 may be executed via a web browser of a graphical user interface (GUI) shown on the display 208. In one embodiment, the display 208 may be touch screen interface or may include physical buttons (not shown) to navigate menus and options shown on the display 208.

In one embodiment, a user may select desired files that are accessed from the third party application service provider 110 using the MFD based third party application 210. The files may then be selected for a job function or job request to be executed on the MFD 108. For example, the files may be printed, emailed to other users, and the like.

As a result, the MFD 108 and the associated network 100 of the present disclosure allow updates to third party applications used on the MFD 108 to be easily updated and deployed. A service provider of the MFD 108 may generate an update and store the update remotely and allow each MFD 108 to access the updates 112. This provides a more efficient way to deploy updates for the MFD based third party applications 210 stored on the MFDs 108.

Figure 3:
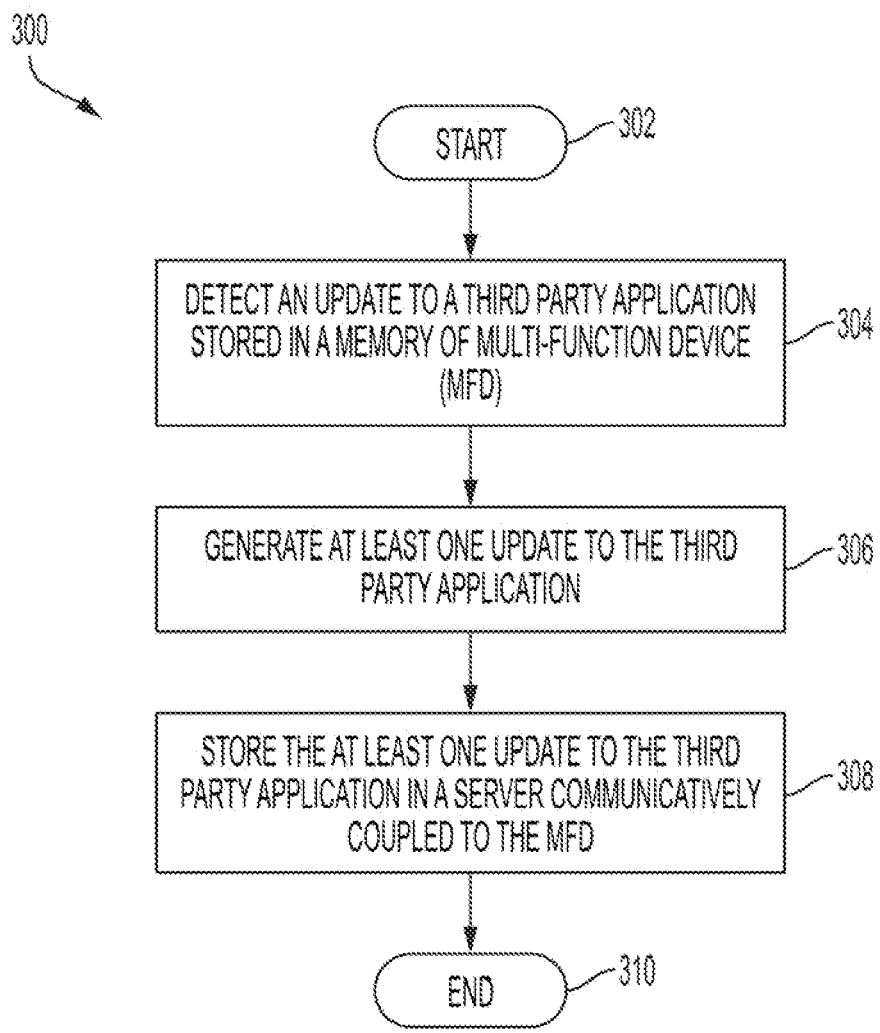
FIG. 3 illustrates a flow chart of a method for automatically updating a third party application for use on an MFD of the present disclosure.

FIG. 3 illustrates a flow chart of an example method 300 for automatically updating a third party application for use on an MFD of the present disclosure. In one embodiment, the method 300 may be performed by the MFD 108 or an apparatus, such as the apparatus 500 illustrated in FIG. 5 and discussed below.

In one embodiment, the method 300 begins at block 302. At block 304, the method 300 detects an update to a third party application stored in a memory of an MFD. For example, the third party applications stored in the memory of the MFD may be periodically tested. The testing may be performed remotely via a debugging operation by a service provider of the MFD. The update may be detected when the third party application stored in the memory of the MFD fails to execute properly during testing or debugging.

At block 306, the method 300 generates at least one update to the third party application. In one embodiment, the service provider of the MFD may communicate with a service provider of the third party application to determine the updates that were made. The service provider of the MFD may then generate corresponding updates to be used with the third party application stored in the memory of the MFD.

As noted above, the service provider may deploy different models of the MFDs with different capabilities. Thus, a corresponding update may be generated for each model of MFD or each MFD with different capabilities. In one embodiment, the update may be generated as separate selectable files that can be dynamically packaged for the MFD based on the model and/or capabilities of the MFD. Thus, unique updates can be dynamically created for different MFDs based on which features are selected from the update and packaged together.

At block 308, the method 300 stores the at least one update to the third party application in a server communicatively coupled to the MFD. The update may be stored in a database located remotely in an IP network.

In one embodiment, when the update is generated and stored, a notification or annotation may be transmitted to the MFD. The annotation may modify the third party application stored in the memory of the MFD to indicate that an update exists. The annotation may direct the MFD to contact the server to obtain the appropriate updates for the third party application from the server. At block 310, the method 300 ends.

Figure 4:
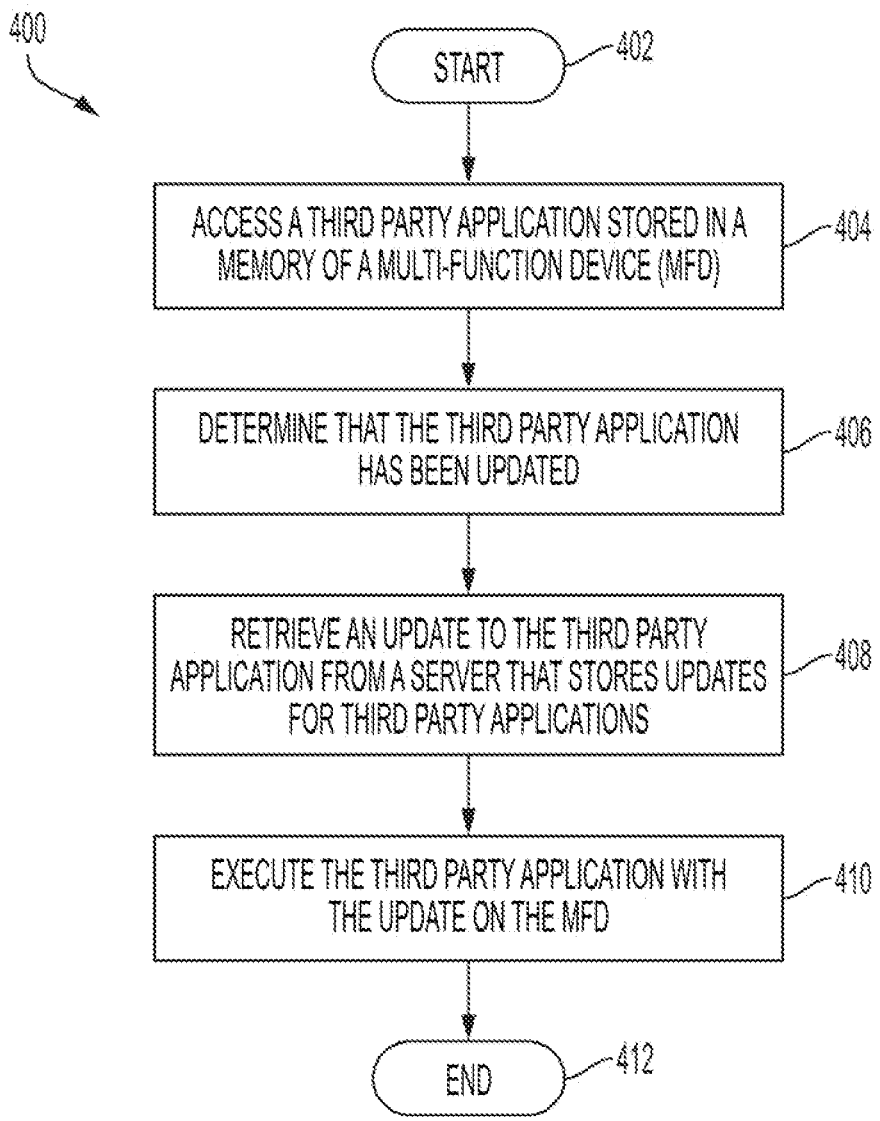
FIG. 4 illustrates a flow chart of a method for executing a third party application on an MFD that has been updated of the present disclosure.

FIG. 4 illustrates a flow chart of an example method 400 for executing a third party application on an MFD that has been updated of the present disclosure. In one embodiment, the method 400 may be performed by the MFD 108 or an apparatus, such as the apparatus 500 illustrated in FIG. 5 and discussed below.

In one embodiment, the method 400 begins at block 402. At block 404, the method 400 accesses a third party application stored in a memory of the MFD. For example, a MFD based third party application may be stored in the memory of the MFD. The MFD based third party application may be a local version of a third party application created for mobile devices and/or personal computers. The local version may be created by a service provider or manufacturer of the MFD to be compatible with the operating system and/or programming language associated with the MFD. The MFD based third party application may allow a user to access services from the third party application service provider directly from the MFD (e.g., accessing files from a cloud storage service provider directly from a GUI or web browser of the MFD).

In one embodiment, the third party application may be deployed as a weblet and a weblet wrapper. For example, the weblet may be a snippet of code designed to encapsulate some HTML functions that are generated and maintained by a service provider of the MFD. The weblet may allow certain functions on a proprietary web browser associated with the MFD to be executed. Thus, some HTML functions that may be executed on a desktop computer may be executed using a weblet on the web browser of the MFD. A weblet may be created for each third party application that is to be executed locally on the MFD.

In one embodiment, each weblet may be called using a weblet wrapper. The weblet wrapper may include some input fields that allow the correct weblet to be executed.

At block 406, the method 400 determines that the third party application has been updated. In one embodiment, the method 400 may determine that the third party application has been updated when the third party application fails to execute on the MFD. When the third party application fails, the MFD may generate a request for an update from a server that stores the updates that were generated as described in method 300 and illustrated in FIG. 3.

In one embodiment, the method 400 may determine that the third party application has been updated when accessing a weblet wrapper of the third party application. For example, the weblet wrapper may be modified when an updated is generated or created, as described in the method 300 and illustrated in FIG. 3. The modification may include an annotation or extension that is added to the weblet wrapper when the weblet is called by the MFD.

At block 408, the method 400 retrieves an update to the third party application from a server that stores updates for third party applications. In one embodiment, the extension added to the weblet wrapper or MFD based third party application may include a URL address of a server that has the updates that were generated.

In one embodiment, the MFD may connect to the server via the URL address. The MFD may send a request for an update for the third party application stored on the MFD. The request may include the MFD providing a model number of the MFD, a serial number, capability information, or any other type of information that may help to identify the MFD and what capabilities are associated with the MFD.

In one embodiment, the update that is received may be one of a plurality of different updates that is generated and stored for different types of MFDs. For example, a first update may be generated for a first MFD with a first set of capabilities, a second update may be generated for a second MFD with a second set of capabilities, and so forth.

In one embodiment, the update that is received maybe dynamically created or packaged by the server based on the model number of the MFD. For example, the server may determine the capabilities of the MFD based on the model number or serial number of the MFD. The server may then selectively include various features associated with the MFD that can be used by the MFD. The features may be packaged into an update file that is transmitted to the MFD for updating the third party application that is stored in the memory of the MFD.

At block 410, the method 400 executes the third party application with the updated on the MFD. For example, the third party application may be executed with the update. The updated third party application may then allow the MFD to access the services of the third party application service provider.

For example, the third party application service provider may be a cloud storage service provider and the third party application may be a cloud storage application. The third party application may be executed by a web browser displayed on a GUI of the MFD. The third party application may allow a user to access files in an account of the user in the third party application service provider. The user may select a file from the third party application service provider and then execute a job request or function on the file that is selected. For example, the job request may be to print the file, email the file to another user via the MFD, and the like.

As a result, the present disclosure may allow the third party application to operate correctly on the MFD even if the third party application service provider updates the application. The update may be detected by the service provider or manufacturer of the MFD, and an update may be generated that is compatible with the MFD. The update may be stored in the network on a server or database and accessed by the MFDs remotely. The MFDs may access the update in response to detecting that the third party application does not execute properly or detecting an extension that includes the URL address of the server on a weblet wrapper that calls a weblet to execute the third party application. At block 412, the method 400 ends.

Figure 5:
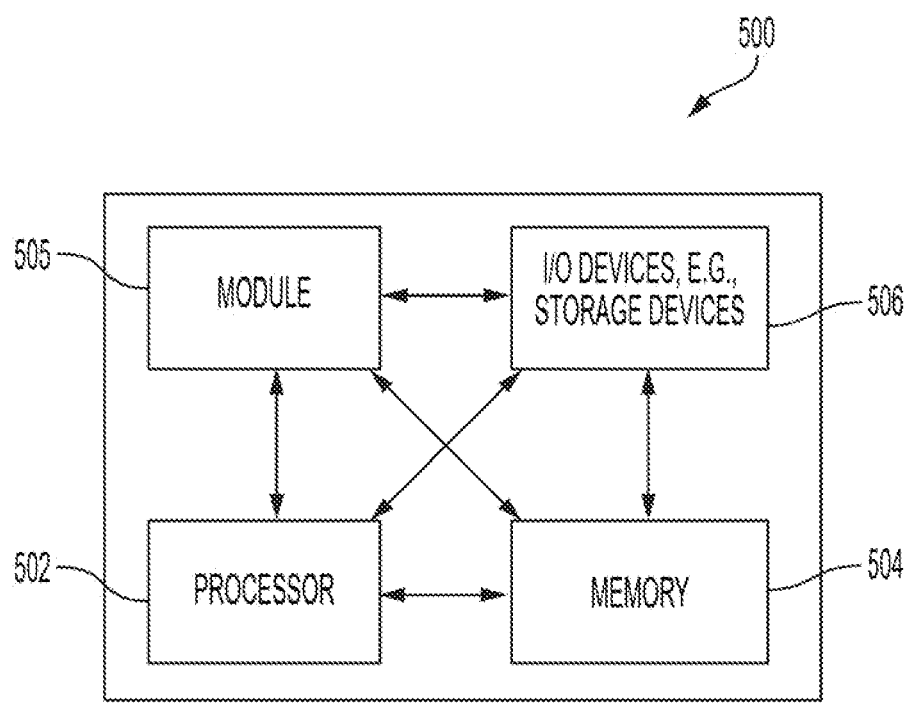
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for executing a third party application on an MFD that has been updated, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for executing a third party application on an MFD that has been updated (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for executing a third party application on an MFD that has been updated (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   accessing, by a processor of a multi-function device (MFD) having print capabilities, a third party application stored in a memory of the MFD, wherein the third party application is created by a service provider of the MFD based off of an application distributed by a third party application service provider in a programming language that is proprietary to the MFD and is different from programming languages of a mobile device and a desktop computer;

determining, by the processor, that the third party application has been updated based on a remote debugging operation performed by the service provider of the MFD;

annotating, by the processor, a weblet wrapper associated with the third party application stored on the MFD, wherein the weblet wrapper is annotated with an extension that includes a universal resource locator (URL) address of an application server of the service provider of the MFD to access an update associated with the third party application;

detecting, by the processor, an annotation of the weblet wrapper associated with the third party application;

establishing, by the processor, a connection to the application server via the URL address in the annotation of the weblet wrapper in response to detecting the annotation of the weblet wrapper;

transmitting, by the processor, a request to the application server to receive the update;

retrieving, by the processor, the update to the third party application from the application server that stores updates for third party applications;

executing, by the processor, the third party application with the update on the MFD;

receiving, by the processor, a selection of a file from the third party application; and printing, by the processor, the file that is selected on the MFD.

2. The method of claim 1, wherein the retrieving comprises:
providing, by the processor, a model number of the MFD; and
receiving, by the processor, the update, wherein the update is one of a plurality of different updates of the third party application, and wherein the update is associated with the model number of the MFD.

3. The method of claim 1, wherein the retrieving comprises:
providing, by the processor, a model number of the MFD; and
receiving, by the processor, the update, wherein the update selectively includes features that are compatible with the model number of the MFD.

4. The method of claim 1, wherein the third party application is executed within a web browser of the MFD.

5. The method of claim 1, wherein the third party application comprises a cloud storage application.

6. A non-transitory computer-readable medium storing a plurality of instructions, which when executed by a processor of a multi-function device (MFD) having print capabilities, causes the processor to perform operations, comprising:
accessing a third party application stored in a memory of the MFD, wherein the third party application is created by a service provider of the MFD based off of an application distributed by a third party application service provider in a programming language that is proprietary to the MFD and is different from programming languages of a mobile device and a desktop computer;
determining that the third party application has been updated based on a remote debugging operation performed by the service provider of the MFD;
annotating a weblet wrapper associated with the third party application stored on the MFD, wherein the weblet wrapper is annotated with an extension that includes a universal resource locator (URL) address of an application server of the service provider of the MFD to access an update associated with the third party application;
detecting an annotation of the weblet wrapper associated with the third party application;
establishing a connection to the application server via the URL address in the annotation of the weblet wrapper in response to detecting the annotation of the weblet wrapper;
transmitting a request to the application server to receive the update;
retrieving the update to the third party application from a server that stores updates for third party applications;
executing the third party application with the update on the MFD;
receiving a selection of a file from the third party application; and
printing the file that is selected on the MFD.

7. The non-transitory computer-readable medium of claim 6, wherein the retrieving, comprises:
providing a model number of the MFD; and
receiving the update, wherein the update is one of a plurality of different updates of the third party application, and wherein the update is associated with the model number of the MFD.

8. The non-transitory computer-readable medium of claim 6, wherein the retrieving, comprises:
providing a model number of the MFD; and
receiving the update, wherein the update selectively includes features that are compatible with the model number of the MFD.

9. The non-transitory computer-readable medium of claim 6, wherein the third party application is executed within a web browser of the MFD.

10. The non-transitory computer-readable medium of claim 6, wherein the third party application comprises a cloud storage application.

11. A method, comprising:
determining, by a processor of a multi-function device (MFD) having print capabilities, that a third party application that is created by a service provider of the MFD based off of an application distributed by a third party application service provider in a programming language that is proprietary to the MFD and is different from programming languages of a mobile device and a desktop computer has been updated based on a remote debugging operation performed by the service provider of the MFD;
annotating, by the processor, a weblet wrapper associated with the third party application that has been updated, wherein the weblet wrapper is annotated with an extension that includes a universal resource locator (URL) address of an application server of the service provider of the MFD to access an update associated with the third party application;
accessing, by the processor, the third party application stored in a memory of the MFD;
detecting, by the processor, an annotation created as a result of the annotating;
accessing, by the processor, the application server that stores a plurality of different updates via the URL address contained in the annotation;
providing, by the processor, capabilities of the MFD to the application server;

receiving, by the processor, an update to the third party application based on the capabilities of the MFD from the application server;
executing, by the processor, the third party application on the MFD;
receiving, by the processor, a selection of a file from the third party application; and
printing, by the processor, the file that is selected on the MFD.

* * * * *